United States Patent [19]

Kaasa

[11] Patent Number: 4,975,020

[45] Date of Patent: Dec. 4, 1990

[54] HONEYCOMB CORE GRIPPER APPARATUS

[75] Inventor: Duane O. Kaasa, Snohomish, Wash.

[73] Assignee: The Boeing Company, Seattle, Wash.

[21] Appl. No.: 893,512

[22] Filed: Aug. 5, 1986

[51] Int. Cl.$^5$ .............................................. B65G 59/02
[52] U.S. Cl. ............................... 414/796.9; 294/103.1
[58] Field of Search .................... 414/120; 294/93, 98, 294/119.1, 902, 86.4, 103.1

[56] References Cited

U.S. PATENT DOCUMENTS

| | | | |
|---|---|---|---|
| 1,717,006 | 6/1929 | Cartwright | 294/93 |
| 3,658,374 | 4/1972 | Busam | 294/93 X |
| 4,641,827 | 2/1987 | Walton et al. | 294/86.4 |

FOREIGN PATENT DOCUMENTS

| | | | |
|---|---|---|---|
| 2059854 | 4/1981 | United Kingdom | 294/93 |
| 2100708 | 1/1983 | United Kingdom | 414/117 |

Primary Examiner—Robert P. Olszewski
Assistant Examiner—Janice Krizek
Attorney, Agent, or Firm—Conrad O. Gardner; B. A. Donahue

[57] ABSTRACT

A device for lifting up a single sheet of honeycomb core material from a stock having a pair of opposite facing jaws with angled and hooked teeth. The hooked teeth provide a method whereby insertion into the honeycomb and subsequent spreading of teeth permit stretching of the honeycomb core to a degree permitting the core panel to be lifted.

2 Claims, 2 Drawing Sheets

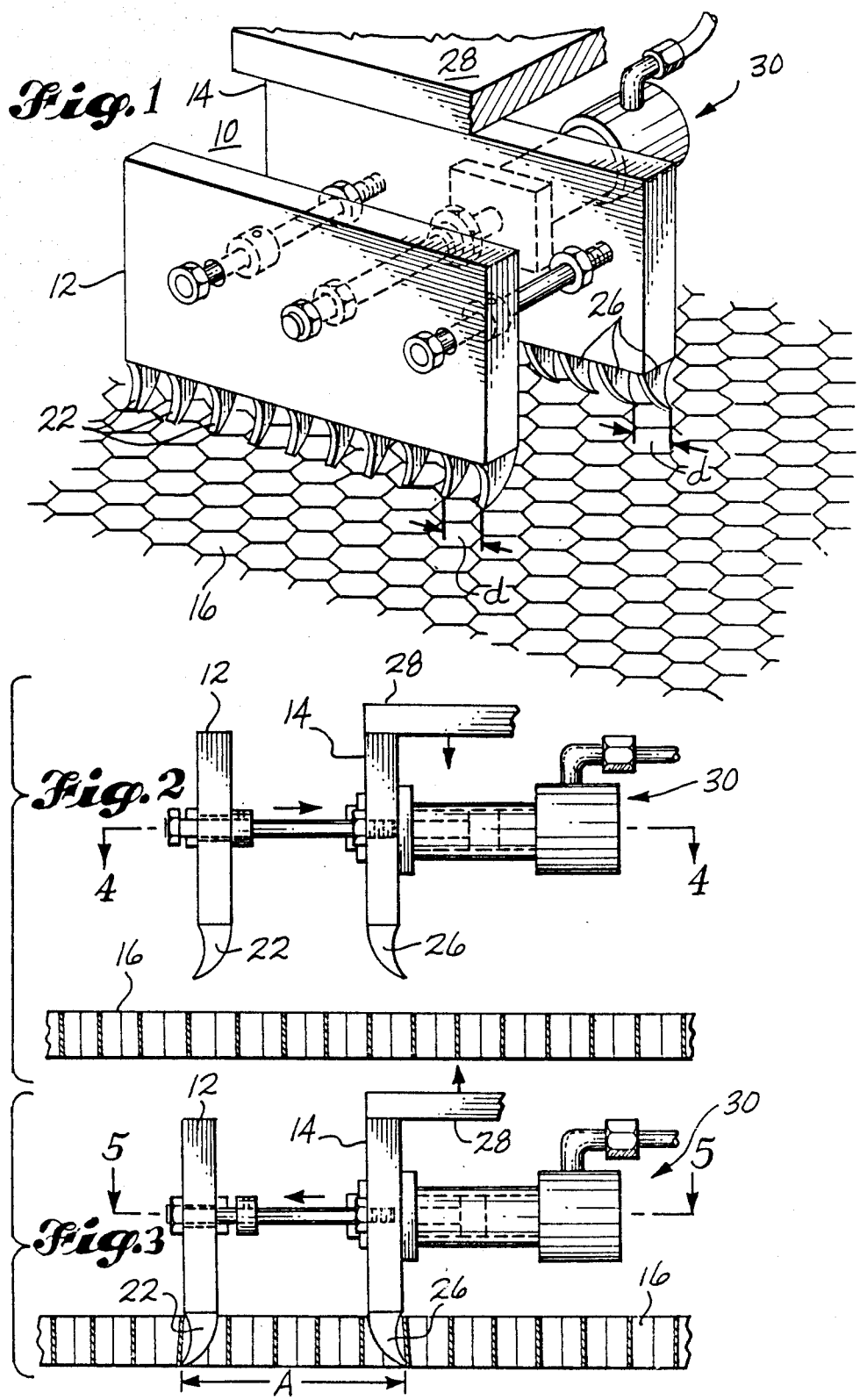

HONEYCOMB CORE GRIPPER APPARATUS

BACKGROUND OF THE INVENTION

With the increasing use of honeycomb core material in panel application, an adequate apparatus and method for lifting sheets of honeycomb core material from stacks and loading it into fixtures of automated robot panel fabrication machines has become necessary. Prior attempts at automating the handling of honeycomb core sheets have always resulted in damage.

The patent literature includes U.S. Pat. No. 3,180,671 issued Apr. 27, 1965 illustrative of means for grasping, lifting, and manipulating steel reinforcing mats. Also, U.S. Pat. No. 2,952,282 issued Sept. 13, 1960 shows a prior art clamp for honeycomb core splicing.

SUMMARY OF THE INVENTION

This invention provides a honeycomb core gripper apparatus and method which solves the problems inherent in lifting and handling of honeycomb core sheets. A pair of opposite facing jaws having teeth that are angled and hooked are pushed into a honeycomb sheet to full depth of the teeth, the honeycomb material being of a nature which will flex to permit penetration of the teeth without precise alignment. Jaws are then spread from a retracted position of the apparatus and the honeycomb is then stretched between the hooked teeth and a single sheet is automatically lifted from a stack and can be fed to a station for the next operation in assembly and manufacture of panel fabrication.

BRIEF DESCRIPTION OF THE DRAWING

This invention may be more clearly defined with reference to the accompanying drawings in which:

FIG. 1 is a perspective view of the present honeycomb core gripper apparatus;

FIG. 2 is a side view of the honeycomb core gripper apparatus of FIG. 1 showing the jaws in retracted position;

FIG. 3 is a side view of the apparatus of FIG. 1 showing the jaws in extended position with teeth at full depth in the honeycomb core sheet;

DESCRIPTION OF THE PREFERRED EMBODIMENT

Figure 4:
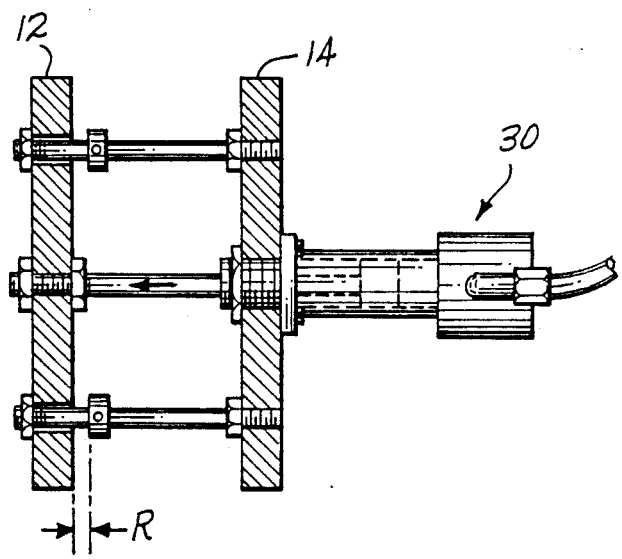
FIG. 4 is a sectional view taken along the lines 4—4 of FIG. 2.
Figure 5:
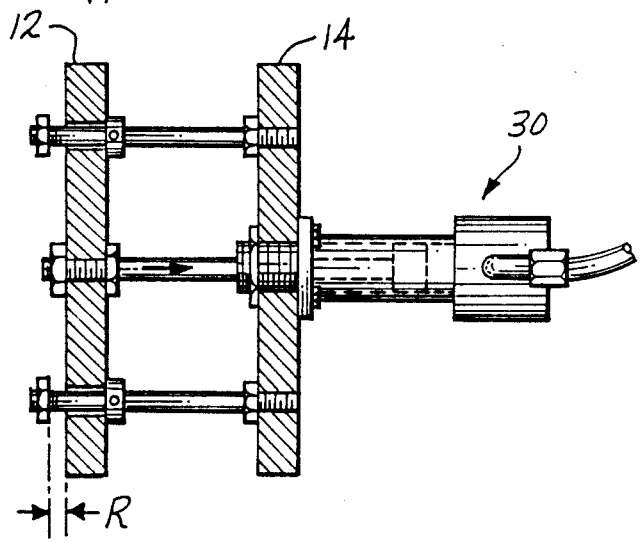
FIG. 5 is a sectional view taken along the lines 5—5 of FIG. 3.

Turning now to FIG. 1, the present honeycomb core gripper apparatus 10 is shown to include a pair of opposite facing jaws 12 and 14. Each of opposite facing jaws 12 and 14 which are juxtaposed in spaced parallel relationship include sets of teeth 22 and 26 respectively which teeth 22 and 26 are angled and hooked in opposite directions. The respective sets of teeth 22 and 26 are inserted into the honeycomb panel 22 by motion of arm 28 as seen in FIG. 2 until the teeth 22 and 26 have been inserted into honeycomb core panel 16 to the full depth of the teeth as seen in FIG. 3. Arm 28 as seen in FIG. 3 then enables positioning of honeycomb core panel 16 to another station. When jaws 12 and 14 are in the fully expanded position as shown in FIG. 3 with sets of teeth 22 and 26 gripping the honeycomb core panel 16, the distance A between the lower end points of the two sets of teeth is about three inches. The dimension A between teeth in fully extended position with jaws 12 and 14 expanded are retracted by distance R as shown in FIGS. 4 and 5 prior to insertion into the honeycomb panel core 16. Jaws 12 and 14 contract a distance R equal to approximately ⅜ inches from their expanded separation distance A of approximately three inches. Honeycomb panel structure 16 will flex to permit the full penetration depth of sets of teeth 22 and 26 without precise alignment, and when the jaws 12 and 14 are expanded within sets of teeth 22 and 26 in honeycomb core panel 16 the honeycomb panel 16 is stretched between the hooked teeth and can be lifted by arm 28 as shown in FIG. 3. Sets of teeth 22 and 26 are separated individually by distance d where d equals approximately two times the pitch of honeycomb core 16. Sets of teeth 22 and 26 which are angled and hooked in opposite directions are thus seen to be contracted a distance of ⅜ inches prior to being pushed a full depth into the sheet of honeycomb core material 16 and then expanded ⅜ inches at full depth to provide a lifting of the honeycomb core 16 for subsequent use without the need for operator alignment or handling. A vacuum operated piston device 30 is shown to provide a means for expanding and contracting jaws 12 and 14 although various means and mechanisms generally can be provided to open and close jaws 12 and 14.

What is claimed is:

1. Apparatus for lifting a sheet of honeycomb core from a stack comprising in combination:
   a pair of jaw members having spaced apart parallel disposed surface portions;
   each of said spaced apart parallel disposed surface portions having a set of teeth extending along an edge thereof;
   said set of teeth extending along an edge of a first of said pair of jaw members angled and hooked in a direction opposite to a further set of angled and hooked teeth extending along an edge of a second of said pair of jaw members; said sets of teeth separated individually by a distance d, where: d is approximately two times the pitch of said honeycomb core; and,
   means for retracting said angled and hooked oppositely directed sets of teeth a predetermined distance by moving one of said pair of jaw members relative to the other.

2. Apparatus according to claim 1 wherein said predetermined distance is about ⅜ inches.

* * * * *